3,136,715
PROCESS OF REMOVING RUTHENIUM FROM
AQUEOUS SOLUTIONS
Lloyd L. Ames, Jr., Richard Fullerton, and Dennis W. Pearce, Richland, Wash., assignors to the United States of America as represented by the United States Atomic Energy Commission
No Drawing. Filed Feb. 9, 1962, Ser. No. 172,355
3 Claims. (Cl. 210—51)

This invention deals with a process of removing ruthenium values from aqueous solutions. The process is particularly useful in the treatment of waters that are contaminated with radioactive ruthenium isotopes, such as $Ru^{106}$; such isotopes occur in cooling waters from nuclear reactors and also in waste solutions obtained in the processing or fissionable fuels. Some of the radioactive cations present in aqueous solutions have been removed heretofore by sorption on clinoptilolite. However, it was discovered that the radioactive ruthenium isotopes are not removed by this mineral.

It is an object of this invention to provide a process for the removal of ruthenium values from aqueous solutions which can be carried out at relatively low temperature, so that no contamination of the atmosphere occurs and no special precaution for protection from such atmospheres is necessary.

It is also an object of this invention to provide a process for the removal of ruthenium values from aqueous solutions whereby the ruthenium values are obtained in a comparatively concentrated form suitable for immediate disposal into the ground or the bottom of the ocean.

It has been found that ferric oxide, preferably in statu nascendi, has a particularly strong affinity to ruthenium and that it removes the highly radioactive $Ru^{106}$ isotope from aqueous solutions even though these isotopes are present only in very low concentrations. This invention is based on this finding.

The subject process comprises adding a water-soluble ferrous salt, e.g. ferrous sulfate, to the aqueous ruthenium-containing solution to be treated and passing the solution over calcite, whereby a reaction between the ferrous salt and the calcite takes place and ferric oxide forms and deposits on the calcite, and the ruthenium is taken up by the ferric oxide thus formed.

The concentration of ferrous salt in the solution to be treated, the feed solution, may vary widely; the range of from 10 p.p.m. up to saturation has been found satisfactory. However, the range between 40 and 60 p.p.m. was preferred. It should be understood, though, that ferrous salt concentrations outside these two ranges are also operative.

The feed solution can have a pH value of between 2 and 5, but preferably is at about 3.5; it can be processed according to this invention while at room temperature, which is at about 25° C. The calcite is advantageously used in granulated or finely divided form, a particle size of between 0.25 and 1 mm. being particularly well suitable.

Apart from the removal of ruthenium by the ferric oxide formed, some of the other radioactive isotopes present in the feed solutions were simultaneously removed by the calcite alone or by the ferric oxide formed with the calcite. Thus, for example, $Sr^{90}$ was found to be sorbed by calcite, and $Zn^{65}$ was found to react with the calcite under the formation of zinc carbonate which was held by the calcite. The removal of $Zn^{65}$ is often necessary to condition waters into which radioactive solutions have been discharged. In particular, rivers that contain $Zn^{65}$ and are inhabited by oysters ought to be decontaminated from the $Zn^{65}$, because the oysters have the characteristic to concentrate $Zn^{65}$ to a particularly high degree in their systems, which may make these oysters less desirable as food. Calcite per se was also found to remove $P^{32}$.

In the following, a few examples are given to illustrate the operativeness of the process of this invention.

EXAMPLE I

A feed solution 1 M in sodium nitrate, containing $Ru^{106}$ in a concentration of about 5000 d./m./ml., having a pH value of about 3.5 and a temperature of 25° C., was flowed at a rate of 100 gals./ft.²/hr. through a column containing 75 grams of calcite of a particle size ranging between 1 and 0.25 mm. Three runs were carried out, the first run without adding ferrous sulfate and the two others with ferrous sulfate, but different concentrations. The effluents were analyzed in the first run after twelve column volumes of aqueous solution were passed through the calcite, and after nine column volumes in the other two instances. (The quantities of waters are expressed in "column volumes," which means one column volume of solution has the same volume as the volume of calcite through which it is passed.) The ruthenium removal, in all examples given herein, is expressed in the form of the distribution coefficient, which is the ruthenium concentration in the effluent (C): ruthenium concentration in feed ($C_0$). The results of the three runs are summarized in Table I.

Table I

| $Fe^{+2}$ concentration in feed, p.p.m. | $Ru^{106}$ $C/C_0$ | Column volumes |
|---|---|---|
| 0.0 | 0.980 | 12.0 |
| 5.6 | 0.357 | 9.0 |
| 56.0 | 0.222 | 9.0 |

The above results clearly show that the ruthenium decontamination is radically better when ferrous ions have been added to the feed solution. The concentration of ferrous ion, however, need be very small, as is obvious from the good decontamination obtained with 5.6 p.p.m. of ferrous ion; however, the higher ferrous ion concentration of 56 p.p.m., which still must be considered small, improved the decontamination still further.

When an aqueous solution containing $Cs^{137}$ and ferrous ions was passed through the calcite bed, the effluent contained the same concentration of cesium as was present in the feed solution; in other words, ferric oxide is not operative for cesium removal.

EXAMPLE II

Another series of experiments was carried out under conditions identical to those used in Example I with the exception that different volumes of feed solution were treated in each run. Also, the feed solution in all runs contained ferrous ions in a concentration of 56 p.p.m. The results of these tests are listed in Table II.

Table II

| Run | $Ru^{106}$ $C/C_0$ | Column volumes |
|---|---|---|
| 1 | 0.184 | 2.0 |
| 2 | 0.183 | 4.0 |
| 3 | 0.237 | 6.0 |
| 4 | 0.201 | 8.0 |
| 5 | 0.184 | 10.0 |
| 6 | 0.219 | 12.0 |
| 7 | 0.218 | 14.0 |
| 8 | 0.187 | 16.0 |

Table II illustrates that the decontamination takes place continuously and that there is no decrease of sorptive capacity. As the ferrous-ion-containing solution is contacted with the calcite, new ferric oxide is continuously formed and new quantities of ruthenium are removed by sorption. This is clearly obvious from the almost identical distribution coefficients, within the limit of experimental error, for all eight runs of Table II.

The next example shows the removal of $P^{32}$ by calcite in the absence of iron and also its removal on calcite in the presence of ferrous ions in the feed solution.

EXAMPLE III

Tap water containing 200 p.p.m. of calcium plus sodium cations and $P^{32}$ in an approximate concentration of 10,000 d./m./ml. was passed over 75 grams of calcite of the same particle size as that used in the previous examples. The feed solution had a pH value of 3.5, a temperature of 25° C. and was passed through the calcite at a rate of 100 gals./ft.$^2$/hr. In runs 1–3 no iron was present in the feed solution, while the feeds for runs 4–7 contained 5.6 p.p.m. of ferrous ions in the form of ferrous sulfate. The distribution coefficients obtained are summarized in Table III.

*Table III*

| Run | $P^{32}$ C/C$_0$ | Column volume |
|---|---|---|
| 1 | 0.039 | 9 |
| 2 | 0.052 | 18 |
| 3 | 0.021 | 27 |
| 4 | 0.038 | 9 |
| 5 | 0.013 | 13 |
| 6 | 0.008 | 27 |
| 7 | 0.009 | 36 |

The above experiments illustrate that calcite alone has a rather good decontaminating effect in regard to the phosphorus but that the ferric oxide formed by the reaction of the calcite with the ferrous sulfate in the feed solution improves the decontamination considerably, particularly when greater volumes of solution are passed through the calcite.

Similar experiments were also carried out with feed solutions containing $Zn^{65}$ in concentrations ranging between 200 and 500 d./m./ml. and having a pH value ranging between 6 and 8; some of the solutions contained sodium nitrate in a concentration of 0.3 N, while the others did not contain any sodium nitrate. These runs yielded distribution coefficient in the range of between 0.0001 and 0.0997.

The process of this invention is applicable to any waste solution in which the addition of ferrous irons does not bring about a precipitation of ferric hydroxide or gas evolution when in contact with the calcite. The process is of prime importance for the treatment of waste condensates and cooling waters derived from nuclear reactors.

While the process of this invention has been described primarily using a continuous column operation, which is the preferred method, it will be understood that it also can be carried out as a discontinuous batch process or any other way known to those skilled in the art.

It will also be understood that the invention is not to be limited to the details given herein but that it may be modified within the scope of the appended claims.

What is claimed is:

1. A process of removing ruthenium values from an aqueous solution, consisting in adjusting the pH value of said solutions to between 2 and 5, adding ferrous ions to said solution, contacting said solution with calcite whereby ferric oxide is formed on said calcite and the ruthenium values are sorbed by said ferric oxide, and separating the ruthenium-depleted solution from the calcite.

2. The process of claim 1 wherein said ferrous ions are added in the form of ferrous sulfate and in a quantity to yield a concentration of at least 10 p.p.m. in the aqueous solution.

3. The process of claim 2 wherein ferrous sulfate is present in a concentration of from 40 to 60 p.p.m.

References Cited in the file of this patent

UNITED STATES PATENTS

| 2,114,576 | Schinman | Apr. 19, 1938 |
| 3,013,978 | Rosinski | Dec. 19, 1961 |